US012229249B1

(12) United States Patent
Tas et al.

(10) Patent No.: US 12,229,249 B1
(45) Date of Patent: Feb. 18, 2025

(54) PROTECTION OF PROCESS MEMORY AGAINST FOREIGN CODE INJECTION

(71) Applicant: Deloitte Development LLC, Hermitage, TN (US)

(72) Inventors: Egemen Tas, North Bergen, NJ (US); Haibo Zhang, Beijing (CN)

(73) Assignee: Deloitte Development LLC, Hermitage, TN (US)

( * ) Notice: Subject to any disclaimer, the term of this patent is extended or adjusted under 35 U.S.C. 154(b) by 358 days.

(21) Appl. No.: 17/746,629

(22) Filed: May 17, 2022

(51) Int. Cl.
| G06F 21/00 | (2013.01) |
| G06F 3/06 | (2006.01) |
| G06F 21/54 | (2013.01) |
| G06F 21/55 | (2013.01) |
| G06F 21/78 | (2013.01) |

(52) U.S. Cl.
CPC ............ *G06F 21/54* (2013.01); *G06F 3/0622* (2013.01); *G06F 3/0631* (2013.01); *G06F 3/0664* (2013.01); *G06F 3/0673* (2013.01); *G06F 21/554* (2013.01); *G06F 21/78* (2013.01)

(58) Field of Classification Search
USPC ........................................................ 726/22
See application file for complete search history.

(56) References Cited

U.S. PATENT DOCUMENTS

| 8,707,437 | B1 | 4/2014 | Ming-Chang et al. |
| 8,726,148 | B1 | 5/2014 | Battilana |
| 9,430,646 | B1 * | 8/2016 | Mushtaq ................. H04L 67/02 |
| 10,187,408 | B1 | 1/2019 | Call et al. |
| 10,205,743 | B2 * | 2/2019 | Cp ....................... H04L 63/1408 |
| 10,489,581 | B2 * | 11/2019 | Xu ....................... H04L 63/1425 |
| 11,436,330 | B1 | 9/2022 | Jennings et al. |
| 12,019,748 | B2 * | 6/2024 | Botelho .............. G06F 11/1451 |

(Continued)

OTHER PUBLICATIONS

Win, Thu Yein et al. Virtualization Security Combining Mandatory Access Control and Virtual Machine Introspection. 2014 IEEE/ACM 7th International Conference on Utility and Cloud Computing. https://ieeexplore.ieee.org/stamp/stamp.jsp?tp=&arnumber=7027632 (Year: 2014).*

(Continued)

*Primary Examiner* — Jeremiah L Avery
(74) *Attorney, Agent, or Firm* — Fish & Richardson P.C.

(57) ABSTRACT

Protection of process memory against foreign code injection is described herein. A system includes at least one processor and at least one memory storing instructions thereon that, when executed by the at least one processor, cause the at least one processor to perform operations. The operations include to dynamically virtualize a protected application in user space, wherein the virtualization comprises a virtualized memory management system and to monitor memory allocated to the virtualized protected application by the virtualized memory management system. The operations include to compare memory allocated by the virtualized memory management system with known allocations of virtual memory. Additionally, the applications include to designate the memory as being injected with foreign code in response to the virtualized memory management system detecting privileges not created by the virtualized memory management system.

20 Claims, 3 Drawing Sheets

(56) References Cited

U.S. PATENT DOCUMENTS

| | | | |
|---|---|---|---|
| 2003/0097409 A1* | 5/2003 | Tsai | H04L 63/1408 709/206 |
| 2005/0120242 A1 | 6/2005 | Mayer et al. | |
| 2006/0206937 A1 | 9/2006 | Repasi et al. | |
| 2007/0169191 A1 | 7/2007 | Greene et al. | |
| 2009/0254994 A1 | 10/2009 | Waterson | |
| 2010/0058479 A1 | 3/2010 | Chen et al. | |
| 2012/0079282 A1 | 3/2012 | Lowenstein et al. | |
| 2012/0254994 A1* | 10/2012 | Sallam | G06F 21/554 726/22 |
| 2012/0254995 A1* | 10/2012 | Sallam | G06F 21/52 726/22 |
| 2012/0255003 A1* | 10/2012 | Sallam | G06F 21/554 726/23 |
| 2012/0255004 A1* | 10/2012 | Sallam | G06F 21/554 726/23 |
| 2012/0255011 A1* | 10/2012 | Sallam | G06F 21/53 726/24 |
| 2012/0255012 A1* | 10/2012 | Sallam | G06F 21/554 726/23 |
| 2012/0255013 A1* | 10/2012 | Sallam | G06F 21/564 726/24 |
| 2012/0255014 A1* | 10/2012 | Sallam | G06F 21/554 726/24 |
| 2012/0255016 A1* | 10/2012 | Sallam | G06F 21/566 726/24 |
| 2013/0097708 A1* | 4/2013 | Jayanthi | H04L 63/145 726/25 |
| 2013/0312099 A1* | 11/2013 | Edwards | G06F 21/554 726/24 |
| 2014/0298461 A1* | 10/2014 | Hohndel | G06F 21/56 726/23 |
| 2015/0052616 A1* | 2/2015 | Hutchison | G06F 3/0632 726/27 |
| 2016/0117498 A1* | 4/2016 | Saxena | G06F 21/445 726/26 |
| 2017/0091450 A1* | 3/2017 | Turgeman | H04L 63/145 |
| 2017/0295188 A1* | 10/2017 | David | H04L 63/20 |
| 2018/0101678 A1* | 4/2018 | Rosa | G06F 3/0622 |
| 2018/0247045 A1* | 8/2018 | David | H04L 63/20 |
| 2018/0307840 A1* | 10/2018 | David | H04L 63/101 |
| 2019/0042730 A1* | 2/2019 | Yamada | G06F 21/554 |
| 2020/0327222 A1* | 10/2020 | Chhabra | H04L 63/0421 |
| 2021/0034743 A1 | 2/2021 | Tan et al. | |
| 2021/0215788 A1 | 7/2021 | Hu et al. | |
| 2021/0286899 A1 | 9/2021 | Schroeder et al. | |
| 2021/0342020 A1 | 11/2021 | Jorasch et al. | |
| 2022/0045848 A1 | 2/2022 | Hulshof | |
| 2022/0292196 A1* | 9/2022 | Bhagi | G06F 21/554 |

OTHER PUBLICATIONS

Greamo, Chris; Ghosh, Anup. Sandboxing and Virtualization: Modern Tools for Combating Malware. IEEE Security & Privacy, vol. 9, Issue: 2. https://ieeexplore.ieee.org/stamp/stamp.jsp?tp=&arnumber=5739643 (Year: 2011).*

Patil, Manisha; Pramod, Dhanya. Study of an effective way of detecting unexpected permission authorization to mobile apps. 2017 International Conference on Intelligent Computing and Control Systems (ICICCS). https://ieeexplore.ieee.org/stamp/stamp.jsp?tp=& arnumber=8250682 (Year: 2017).*

Nasaka et al., "A Keystroke Logger Detection Using Keyboard-Input-Related API Monitoring," Proceedings of the 2011 14th International Conference on Network-Based Information Systems, Sep. 7-9, 2011, Tirana, Albania, 6 pages.

Solairaj et al., "Keyloggers software detection techniques," Proceedings of the 2016 10th International Conference on Intelligent Systems and Control (ISCO), Jan. 7-8, 2016, Coimbatore, India, 6 pages.

* cited by examiner

PROTECTION OF PROCESS MEMORY AGAINST FOREIGN CODE INJECTION

TECHNICAL FIELD

This description is related to process memory protection.

BACKGROUND

Code injection refers to an attack where a malicious process injects codes into a legitimate process, bypassing security suites or stealing information from the legitimate process. The malicious process writes code into the address space of a legitimate process or target application. The injected code can be a code fragment or a standalone library such as a portable executable (PE) file.

SUMMARY

Provided herein are techniques to protect process memory against foreign code injection. In some embodiments, a system includes at least one processor and at least one memory storing instructions thereon that, when executed by the at least one processor, cause the at least one processor to dynamically virtualize a protected application in user space, wherein the virtualization comprises a virtualized memory management system. The instructions cause the processor to monitor memory allocated to the virtualized protected application by the virtualized memory management system and compare memory allocated by the virtualized memory management system with known allocations of virtual memory. The instructions cause the processor to detect, using the virtualized memory management system, privileges not created by the virtualized memory management system and designate the memory as being injected with foreign code.

In some embodiments, a method is provided. The method includes dynamically virtualizing a protected application in user space, wherein the virtualization comprises a virtualized memory management system. The method includes monitoring memory allocated to the virtualized protected application by the virtualized memory management system and comparing memory allocated by the virtualized memory management system with known allocations of virtual memory. The method includes detecting privileges not created by the virtualized memory management system and designating, with the at least one processor, the memory as being injected with foreign code.

In some embodiments, at least one non-transitory storage media is provided. The at least one non-transitory storage media stores instructions that, when executed by at least one processor, cause the at least one processor to dynamically virtualize a protected application in user space, wherein the virtualization comprises a virtualized memory management system. The instructions cause the at least one processor to monitor memory allocated to the virtualized protected application by the virtualized memory management system and compare memory allocated by the virtualized memory management system with known allocations of virtual memory. The instructions cause the at least one processor to detect privileges not created by the virtualized memory management system and designate the memory as being injected with foreign code.

The details of one or more embodiments of the invention are set forth in the accompanying drawings and descriptions below. Other features, objects and advantages of the invention will be apparent from the description and drawings, and from the claims.

DETAILED DESCRIPTION

Figure 1:
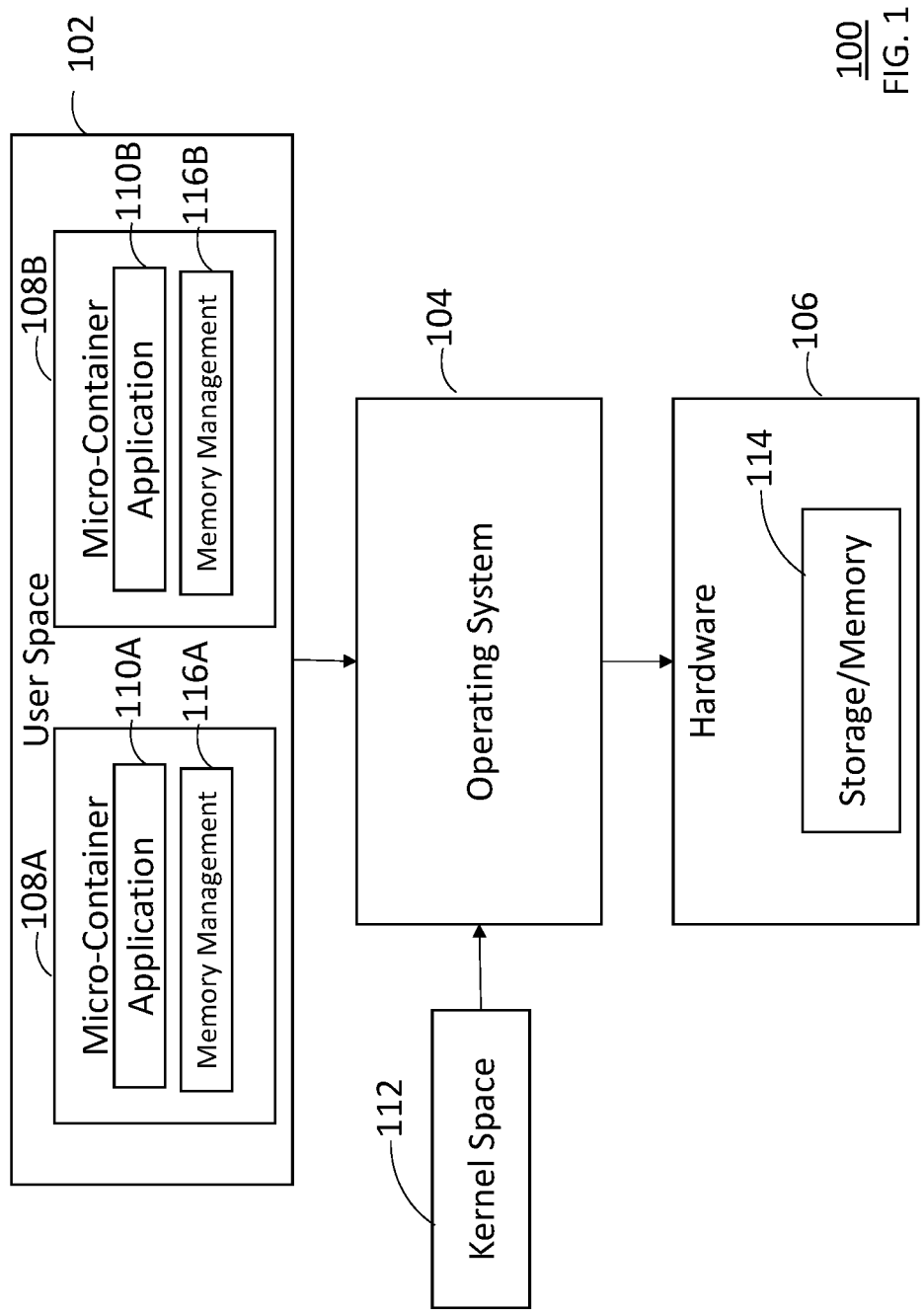
FIG. 1 is a block diagram of a system including microcontainers that virtualize an application in a user space.

Generally, an application is a process that can instantiate (e.g., spawn) one or more sub-processes (collectively referred to as processes). The processes are executable to perform one or more functions. In examples, a process may refer to an instance of a particular executable (.exe program file) running. An application may have several processes executing simultaneously. An operating system enables execution of applications by providing resources such as packages, libraries, and application programming interfaces (APIs) that support both protected and unprotected applications. The operating system also allocates memory resources for use by the applications. In examples, a protected application is an application that is secure against malicious processes with access to a protected address space, while an unprotected application is an application that is not secure against malicious processes and does not access protected address spaces. A malicious process is also referred to as malware, and is a file or code that infects, explores, steals, or performs other actions that compromise another application. In examples, a privileged process has elevated rights to access system resources including hardware, services, and drivers. In a Linux operating system, for example, a privileged process has elevated access as a root (e.g., Linux superuser account). In a Windows operating system, for example, a privileged process has elevated access as an administrator (e.g., Windows administrator account).

Traditional techniques attempt to secure applications from malicious processes using security software for the purposes of self-defense or protecting applications. Traditional techniques include, for example, loading a privileged kernel driver and intercepting operating system calls using interprocess memory access. However, loading privileged drivers requires administrative level access to the hardware and operating system, and may not be possible at all in certain cases. Further, traditional techniques include, for example, injecting a library into all processes (e.g., both protected and unprotected processes) and intercepting the inter-process memory access calls. For an application executing in an unprivileged mode, this system-wise injection of a library will not protect lower privileged processes. For example, when using traditional techniques a lower privileged process would not be protected against a more privileged application (such as a system service) injecting foreign code into the lower privileged application.

Consider an example where a malicious process A injects malicious codes to a process B. A traditional protection library injected to malicious process A via a traditional system-wide library injection scheme to detect code injections can enable protection of attacks from malicious process A injected into process B, regardless of the level of privilege associated with process B. Traditional protection from system-wide library injection uses administrative privileges, and the malicious process A can technically unload or remove injected traditional system-wide library to escape monitoring. Additionally, injecting a traditional system-wide library into all processes is intrusive and dangerous, which can cause compatibility issues for legitimate processes. In examples, the present techniques apply protections to process B that are invisible or undetectable by malicious process A.

The present techniques enable protection of process memory against foreign code injection. In embodiments, the present techniques protect the integrity of process memory against code injection without requiring any privileged access. Micro-containers are generated that execute via a user-space, unprivileged virtualization to protect an arbitrary application. As used herein, a micro-container is a virtualization construct that includes its own custom virtual memory management system. The memory manager of the micro-container is customized to monitor memory allocations and deallocations. In examples, process memory is an addressable space of memory that includes executable code for one or more processes and shared libraries associated with the one or more processes. Traditionally, in order to prevent a first application from injecting codes to a second application, a library is injected into the first application to intercept cross-process memory access APIs, such as NtWrite VirtualMemory. In some embodiments, the present techniques inject code into the second application that detects all injections to the second application, including code from malicious drivers that cannot be protected using traditional techniques with increased compatibility.

Generally, upon initialization of a process, memory for execution of the process is allocated. Dynamic memory allocation refers to the allocation of memory during execution of the process as needed. Static memory allocation refers to a single allocation of memory that persists through the execution of the process. In examples, memory is dynamically allocated and deallocated such that processes can request memory to support execution of the processes. In embodiments, the memory manager periodically scans the memory blocks allocated to a process. In response to discovering non-container allocated memory during a scan, the corresponding memory block is designated as being injected with foreign code. In embodiments, foreign code is detected based on privileges associated with a memory block. Generally, privileges are used to regulate memory access and control the processes that are authorized to read, write, or execute files located in memory. In embodiments, memory that includes write or execute privileges can indicate injection of foreign code. A write privilege grants the ability to change contents of a file or to create new files. An execute privilege grants the ability to execute (e.g., run) a file. If memory is encountered with privileges not allocated by the container itself, that indicates the files are likely foreign code injected into the memory of a legitimate process. For example, a page of memory with write or execute privileges not allocated by the container indicates the page has been injected with foreign code. In embodiments, the detection of injected foreign code is used to make security decisions by security software. For example, the detection of foreign code is flagged using an indicator as a parameter for authorization purposes while implementing a zero-trust access system. In one implementation, this indicator can be used to halt all network access to privileged resources or reduce the available accessible resources. Accordingly, designating the memory as being injected with foreign code is used by security software as an authorization parameter. The authorization parameter may be a data point for authentication and authorization to critical resources such as remote servers.

FIG. 1 is a block diagram of a system 100 including micro-containers 108A and 108B that virtualize an application in a user space 102. The system 100 may be operable according to the process 200 of FIG. 2 or the system 300 of FIG. 3. For ease of description, the terms intercepting or virtualizing, or micro-containing are used interchangeably throughout. Additionally, micro-containerization can be implemented using different techniques such as user space API instrumentation or user-space binary translation and emulation.

In the example of FIG. 1, a user space 102 is illustrated. In examples, a user space is defined by an operating system 104. The operating system 104 partitions the hardware 106, including a virtual memory, into a user space 102 and a kernel space 112. This division into serves to provide memory protection and hardware protection from malicious or errant software behaviors. Generally, the kernel space 112 executes a privileged operating system kernel, kernel extensions, and device drivers. An operating system kernel executes from a protected area of memory. The protected area of memory is an area of memory with privileged writes, which prevents the kernel from being overwritten, such as by a malicious process. In embodiments, the kernel 112 enables communication with the hardware 106. The kernel can schedule process execution via the hardware 106 and manages read and write access to storage/memory 114, including address space provided on in storage and in memory.

The user space 102 is an area of memory where application software and some device drivers execute. In embodiments, the user space 102 includes all processes that execute outside of the operating system kernel space 112. The operating system 104 manages the user space 102, where user processes are run, and will constantly interact with the kernel space 112.

The present techniques enable protecting the integrity of a process against code injection without requiring any privileged access. In embodiments, micro-containers 108A and 108B (e.g., collectively referred to as micro-containers 108) are instantiated within the user space 102. The micro-containers execute via user-space unprivileged virtualization to protect arbitrary applications 110A and 110B (e.g., collectively referred to as applications 110), respectively. In embodiments, the micro-containers 108 are supported by virtualizing hardware and kernel access using the operating system. The virtualized hardware may include a virtual memory, virtual network interface, a virtual CPU, and the like.

In embodiments, the micro-containers 108A and 108B are each self-isolated modules that include respective independent memory management systems 116A and 116B. Generally, the micro-containers 108 encapsulate components necessary to run desired software (e.g., applications 110). These components include files, environment variables, dependencies, and libraries. The operating system 104 constrains the micro-containers' 108 access to physical resources, such as the CPU or storage/memory, so a single micro-container cannot consume all of a host's physical resources. In embodiments, the micro-container includes less components when compared to a virtual machine. A micro-container eliminates the need to launch a complete entire virtual machine for every application, and instead executes via an isolated system, single control host, and accesses a single kernel. Traditional virtual machines operate using a full copy of the operating system as well as a virtual copy of every hardware component running the OS. This consumes a large portion of compute resources, such as storage, memory, and processing resources. Micro-containers 108 are operable using less than a full virtualized operating system. In particular, a micro-container is executable using portions of an OS, such as the libraries and other system resources necessary to run a specific program. In embodiments, each micro-container is customized based on requirements of a corresponding processes to be executed. In examples, the customized micro-containers include packages, libraries, and APIs called by the application. Thus, the micro-container is customized by analyzing processes to be executed and instantiating a micro-container that includes virtualized operating system components for use by the process. In this manner, micro-containers can support a larger number of applications when compared to a virtual machine due to lower compute resource requirements. In embodiments, micro-containers are executed using cloud based resources, enabling edge/mobile implementation for process memory protection against foreign code injection.

The block diagram of FIG. 1 is not intended to indicate that the system 100 is to include all of the components shown in FIG. 1. Rather, the system 100 can include fewer or additional components not illustrated in FIG. 1 e.g., micro-containers, applications, memory management systems, etc.). The system 100 may include any number of additional components not shown, depending on the details of the specific implementation. Furthermore, any of the functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
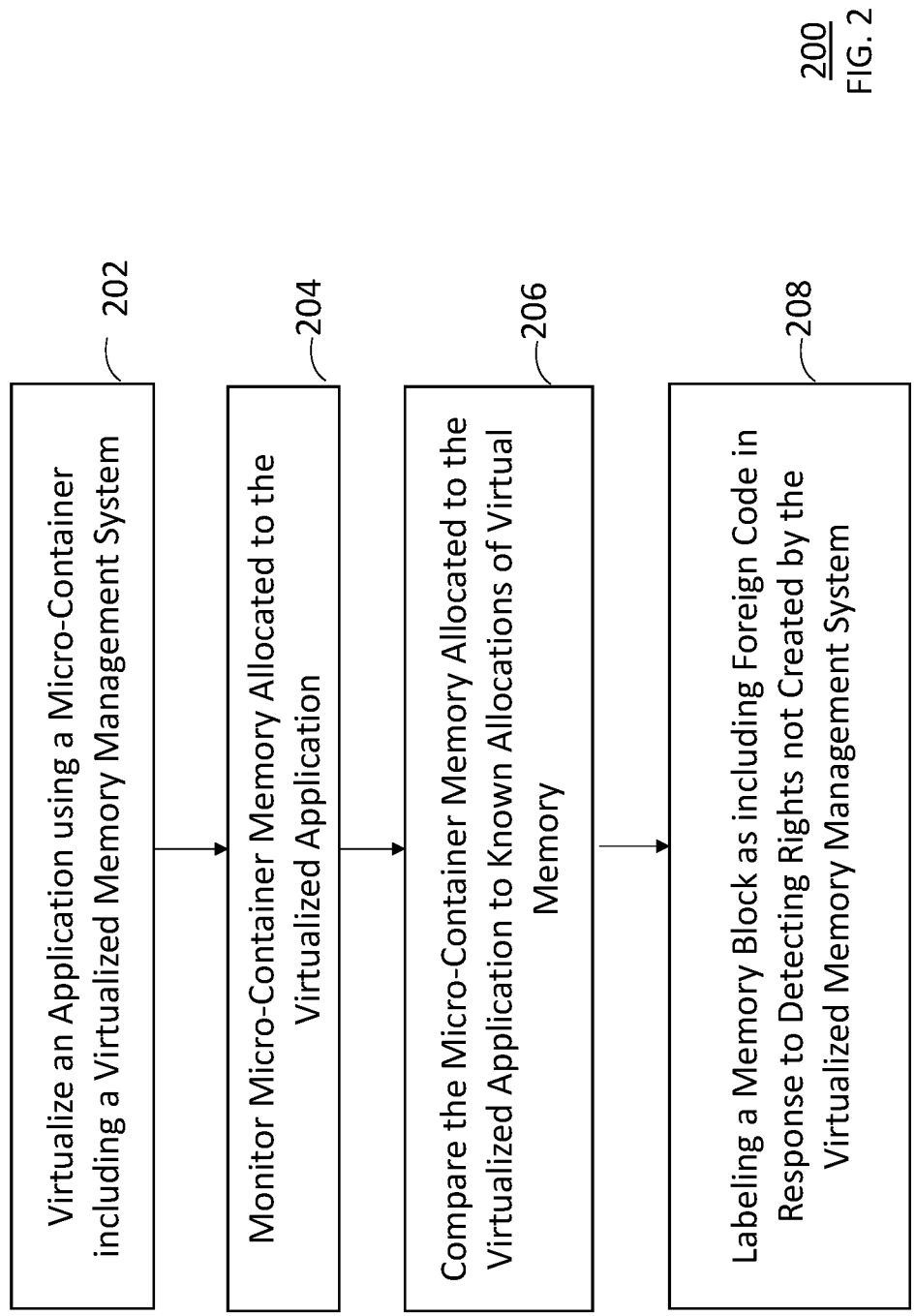
FIG. 2 is a block diagram of a process that enables process memory protection against foreign code injection.

FIG. 2 is a block diagram of a process 200 that enables process memory protection against foreign code injection. At block 202, an application is virtualized by generating a custom micro-container to support execution of the application. Generally, the micro-container includes an isolated, independent, virtualized memory management system. The virtualized memory management may be, in examples, virtualized operating system memory management routines. Memory management routines include creating new virtual memory address space, deleting virtual memory address space, allocating virtual memory address space, deallocating virtual memory address space, and the like.

A micro-container isolates and packages an application (e.g., one or more processes) for execution. The micro-container is customized to provide virtualized resources such as packages, libraries, and APIs corresponding to the application. Additionally, the micro-container is generated dynamically, and on-demand, as needed for execution of a corresponding application. In embodiments, micro-containers consume considerably less hardware resources when compared to virtualization via a full virtual machine, making micro-containers ideal for running multiple instances of a single application, service, or web server. In embodiments, micro-containers function similar to virtual machines but without a hypervisor, resulting in faster resource provisioning and speedier availability of applications. Micro-containers can share access to an operating system kernel without the instantiation of a virtual machine. Generally, micro-containerization is implemented using user space API instrumentation or user-space binary translation and emulation. For example, in a Windows operating system, applications call NtCreateFile (filepath, . . . ) API to open a file. The call is intercepted for contained applications, and the filepath is modified to redirect the call to an isolated area. For network access, a socket API such as connect( ) is intercepted and network traffic is redirected to a predetermined, contained virtual network. For memory protection, a memory allocation API, such as NtAllocate VirtualMemory, NtFree VirtualMemory, etc. is intercepted and redirected.

At block 204, the virtualized memory provisioned to the micro-container for use by the virtualized application is monitored. The isolated, independent, virtualized memory management system of the micro-container monitors privileges associated with the virtualized memory space. In embodiments, upon initialization of an application, the virtualized memory management system evaluates privileges of the application. The virtualized memory management system monitors the memory space in which the application executes. At block 206, the virtualized memory provisioned to the micro-container is compared to known allocations of virtual memory. In examples, the present techniques identify the allocator of executable and writable virtual memory. If the virtual memory is allocated by the system or application itself, then the allocation is allowed. Otherwise it can be a malicious injection. In embodiments, known allocations of virtual memory are provided by the operating system or the application subject to virtualization. In examples, the virtualized memory management system implements time-based periodic memory scanning. In time-based periodic memory scanning, the virtualized memory is scanned by the virtualized memory management system at one or more predetermined time intervals. In examples, the virtualized memory management system implements an event-based aperiodic memory scanning. The virtualized memory management system scans the virtualized memory in response to one or more events at irregular intervals. The events may be, for example, a suspicious activity such visiting external universal resource locators (URLs), accessing sensitive files, or taking a screenshot.

At block 208, the virtualized memory is designated as being injected with foreign code in response to detecting privileges in virtual memory not created by the virtualized memory management system. In embodiments, memory that includes write or execute privileges not created by the virtualized memory indicates the injection of foreign code. Accordingly, if memory is encountered with privileges not allocated by the container itself, this indicates that the files in memory are likely foreign code (e.g., a malicious process) injected into the memory of a legitimate process. In embodiments, when non-container allocated privileges are discovered in the memory allocated to a virtualized application, the code is labeled as foreign code.

In embodiments, the virtualized memory management system of the micro-container maintains a record of all memory allocations and deallocations. The virtualized memory management system periodically scans the memory blocks allocated to an application. Non-micro-container allocated memory is discovered using period scans by the virtualized memory management system. The non-micro-container allocated memory is used for further security purposes. For example, an indication of foreign code injection is an authorization parameter in zero-trust access systems. In a zero-trust access system, a determination of foreign code being injected results in no access. In examples, the indication of foreign code injection causes a halt of all network access to privileged resources. The indication of foreign code injection can also cause a reduction in available accessible resources.

The process flow diagram of FIG. 2 is not intended to indicate that the process 200 is to include all of the steps shown in FIG. 2. Rather, the process 200 can include fewer or additional components not illustrated in FIG. 2 (e.g., additional micro-containers, applications, processes, etc.). The process 200 of FIG. 2 may include any number of additional components not shown, depending on the details of the specific implementation.

Figure 3:
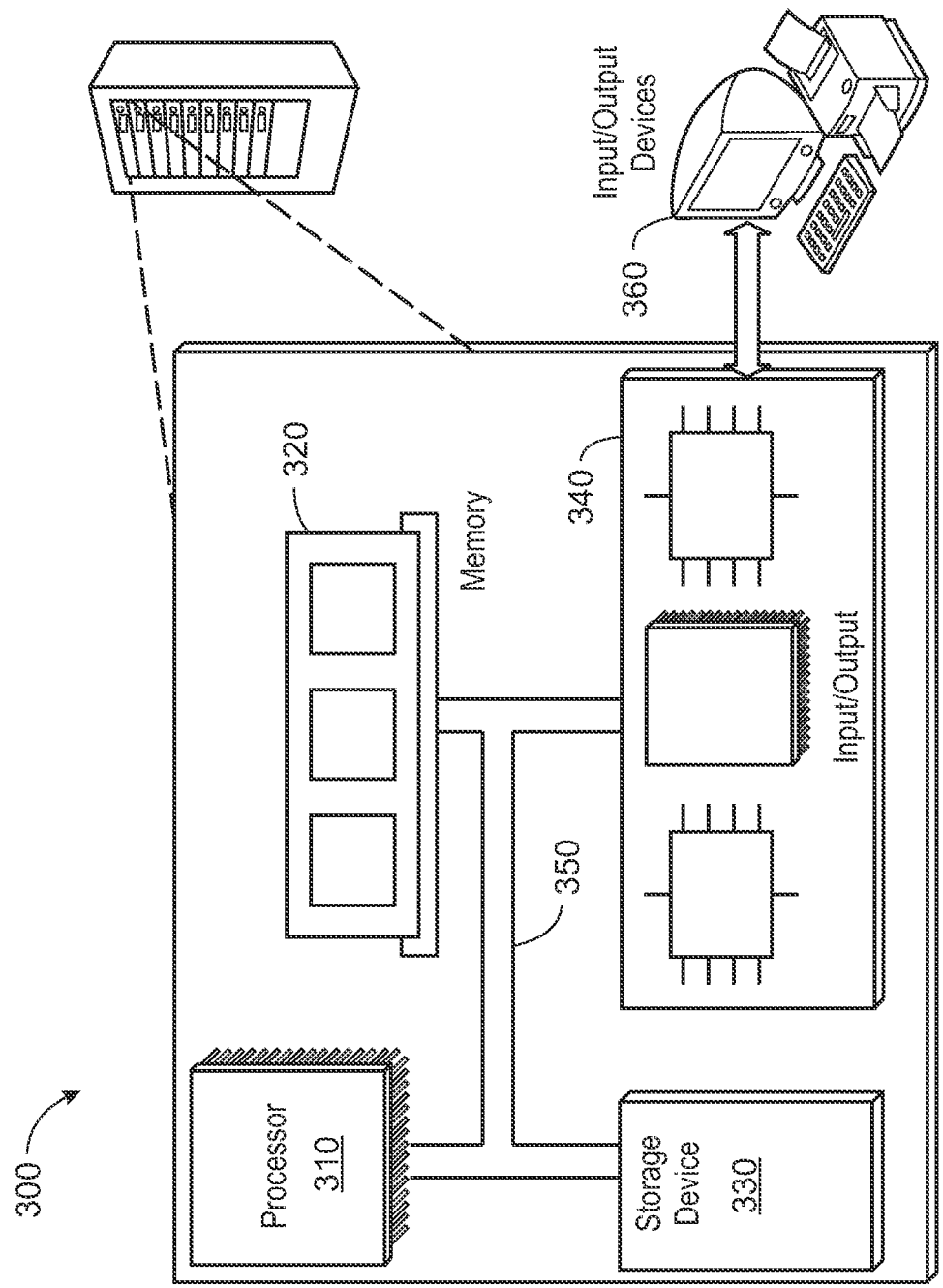
FIG. 3 is a block diagram of an example computer system that enables a method to protect process memory against foreign code injection Like reference symbols in the various drawings indicate like elements.

FIG. 3 is a block diagram of an example computer system that enables a method to protect process memory against foreign code injection. For example, referring to FIG. 1, user space 102, operating system 104, hardware 106, and kernel space 112 could be a part of an example of the system 300 described here. The system 300 includes a processor 310, a memory 320, a storage device 330, and one or more input/output interface devices 340. Each of the components 310, 320, 330, and 340 can be interconnected, for example, using a system bus 350.

The processor 310 is capable of processing instructions for execution within the system 300. The term "execution" as used here refers to a technique in which program code causes a processor to carry out one or more processor instructions. The processor 310 is capable of processing instructions stored in the memory 320 or on the storage device 330. The processor 310 may execute operations such as process memory protection against foreign code injection.

The memory 320 stores information within the system 300. In some implementations, the memory 320 is a computer-readable medium. In some implementations, the memory 320 is a volatile memory unit. In some implementations, the memory 320 is a non-volatile memory unit.

The storage device 330 is capable of providing mass storage for the system 300. In some implementations, the storage device 330 is a non-transitory computer-readable medium. In various different implementations, the storage device 330 can include, for example, a hard disk device, an optical disk device, a solid-state drive, a flash drive, magnetic tape, or some other large capacity storage device. In some implementations, the storage device 330 may be a cloud storage device, e.g., a logical storage device including one or more physical storage devices distributed on a network and accessed using a network. The input/output interface devices 340 provide input/output operations for the system 300. In some implementations, the input/output interface devices 340 can include one or more of a network interface devices, e.g., an Ethernet interface, a serial communication device, e.g., an RS-232 interface, and/or a wireless interface device, e.g., an 802.11 interface, a 3G wireless modem, a 7G wireless modem, a 7G wireless modem, etc. A network interface device allows the system 300 to communicate, for example, transmit and receive such data. In some implementations, the input/output device can include driver devices configured to receive input data and send output data to other input/output devices, e.g., keyboard, printer and display devices 360. In some implementations, mobile computing devices, mobile communication devices, and other devices can be used.

A server or database system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 300 is contained within a single integrated circuit package. A system 300 of this kind, in which both a processor 310 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 340.

Although an example processing system has been described in FIG. 3, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. For example, the functionality described herein may be realized through an application or "app." The app may be located on the device as described herein. The app may also be located on a second device communicatively coupled with a device as described herein. The components of the system can be interconnected by any form or medium of digital data communication, e.g., a communication network. Examples of communication networks include a local area network ("LAN") and a wide area network ("WAN"), e.g., the Internet. The components of the system may also communicate via short range wireless communication standard, such as Bluetooth.

A number of embodiments of the invention have been described. Nevertheless, it will be understood that various modifications may be made without departing from the spirit and scope of the invention.

What is claimed is:

1. A system, comprising:
   at least one processor; and
   at least one memory storing instructions thereon that, when executed by the at least one processor, cause the at least one processor to:
   dynamically virtualize a protected application in user space, wherein the virtualization comprises a virtualized memory management system;
   monitor memory allocated to the virtualized protected application by the virtualized memory management system;
   compare memory allocated by the virtualized memory management system with known allocations of virtual memory;
   detect, by the virtualized memory management system, privileges not created by the virtualized memory management system; and
   designate the memory as being injected with foreign code.

2. The system of claim 1, wherein virtualization is executed without privileged kernel drivers.

3. The system of claim 1, wherein the virtualized memory management system implements a time-based periodic memory scanning.

4. The system of claim 1, wherein the virtualized memory management system implements event-based aperiodic memory scanning.

5. The system of claim 1, wherein memory is scanned without injecting a user space library into unprotected applications.

6. The system of claim 1, wherein designating the memory as being injected with foreign code is used by security software as an authorization parameter.

7. The system of claim 1, wherein designating the memory as being injected with foreign code halts all network access to privileged resources.

8. The system of claim 1, wherein designating the memory as being injected with foreign code reduces an availability of accessible resources.

9. The system of claim 1, wherein virtualization is achieved using micro-containers implemented through user space application programming interface implementation.

10. The system of claim 1, wherein virtualization is achieved using micro-containers implemented through user space binary translation and emulation.

11. A method, comprising:
    dynamically virtualizing, with at least one processor, a protected application in user space, wherein the virtualization comprises a virtualized memory management system;
    monitoring, with the at least one processor, memory allocated to the virtualized protected application by the virtualized memory management system;
    comparing, with the at least one processor, memory allocated by the virtualized memory management system with known allocations of virtual memory;
    detecting, with the at least one processor, privileges not created by the virtualized memory management system; and
    designating, with the at least one processor, the memory as being injected with foreign code.

12. The method of claim 11, wherein virtualization is executed without privileged kernel drivers.

13. The method of claim 11, wherein the virtualized memory management system implements a time-based periodic memory scanning.

14. The method of claim 11, wherein the virtualized memory management system implements event-based aperiodic memory scanning.

15. The method of claim 11, wherein memory is scanned without injecting a user space library into unprotected applications.

16. The method of claim 11, wherein designating the memory as being injected with foreign code is used by security software as an authorization parameter.

17. The method of claim 11, wherein designating the memory as being injected with foreign code halts all network access to privileged resources.

18. The method of claim 11, wherein designating the memory as being injected with foreign code reduces an availability of accessible resources.

19. The method of claim 11, wherein virtualization is achieved using micro-containers implemented through user space application programming interface implementation.

20. At least one non-transitory storage media storing instructions that, when executed by at least one processor, cause the at least one processor to:
    dynamically virtualize a protected application in user space, wherein the virtualization comprises a virtualized memory management system;
    monitor memory allocated to the virtualized protected application by the virtualized memory management system;
    compare memory allocated by the virtualized memory management system with known allocations of virtual memory;
    detect, by the virtualized memory management system, privileges not created by the virtualized memory management system; and
    designate the memory as being injected with foreign code.

* * * * *